US012578986B2

(12) United States Patent　　(10) Patent No.: US 12,578,986 B2

Mizutani　　(45) Date of Patent: Mar. 17, 2026

(54) INFORMATION PROCESSING DEVICE, VEHICLE, INFORMATION PROCESSING METHOD, AND COMPUTER-READABLE STORAGE MEDIUM

(71) Applicant: TOYOTA JIDOSHA KABUSHIKI KAISHA, Toyota (JP)

(72) Inventor: Taiki Mizutani, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 572 days.

(21) Appl. No.: 18/148,515

(22) Filed: Dec. 30, 2022

(65) Prior Publication Data

US 2023/0221984 A1　Jul. 13, 2023

(30) Foreign Application Priority Data

Jan. 11, 2022　(JP) ................................. 2022-002612

(51) Int. Cl.
*G06F 9/455*　(2018.01)
*G06F 9/50*　(2006.01)

(52) U.S. Cl.
CPC ........ *G06F 9/45558* (2013.01); *G06F 9/5077* (2013.01); *G06F 2009/4557* (2013.01)

(58) Field of Classification Search
CPC ............... G06F 9/45558; G06F 9/5077; G06F 2009/4557; G06F 9/4887; G06F 2009/45575; B60R 16/02
See application file for complete search history.

(56) References Cited

U.S. PATENT DOCUMENTS

| | | | |
|---|---|---|---|
| 9,378,035 B2 * | 6/2016 | Kripalani .............. G06F 3/0632 |
| 2006/0206887 A1 | 9/2006 | Dodge et al. |
| 2007/0226739 A1 | 9/2007 | Dodge et al. |
| 2010/0162238 A1 | 6/2010 | Warfield |
| 2010/0162241 A1 | 6/2010 | Koma |
| 2010/0162259 A1 | 6/2010 | Koh |
| 2014/0245294 A1 | 8/2014 | Kaul |

(Continued)

FOREIGN PATENT DOCUMENTS

| | | |
|---|---|---|
| JP | 2006260565 A | 9/2006 |
| JP | 2010147929 A | 7/2010 |
| JP | 2016091109 A | 5/2016 |

OTHER PUBLICATIONS

Taiki Mizutani, U.S. Appl. No. 18/050,149, filed Oct. 27, 2022.

*Primary Examiner* — Dong U Kim

(74) *Attorney, Agent, or Firm* — Dickinson Wright, PLLC

(57) ABSTRACT

In an activation phase, in order to quickly activate an overall management VM0 that has functionality such as performing initialization required to operate respective VMs, the VM0 has 1000 μs and a VM1 and a VM2 each have 0 μs as CPU allocation time periods. In a normal phase, the VM0 has 200 μs and the VM1 and the VM2 each have 400 μs. In a sleep phase, the VM0 has 700 μs and the VM1 and the VM2 each have 150 μs. In a specialist processing phase, the CPU allocation time period for the VM2 that performs specialist processing is increased. In cases in which there is no phase switchover request within a predetermined duration since a switchover was performed to one of the phases, a setting section sets the CPU allocation time periods so as to conform to the normal phase and forcibly transitions to the normal phase.

15 Claims, 5 Drawing Sheets

(56)  References Cited

U.S. PATENT DOCUMENTS

| | | | |
|---|---|---|---|
| 2016/0062780 A1 | 3/2016 | Young | |
| 2016/0124765 A1 | 5/2016 | Kaneko et al. | |
| 2020/0326980 A1 | 10/2020 | Prantner | |
| 2020/0364071 A1* | 11/2020 | Chopra | G06F 11/1448 |
| 2022/0334863 A1 | 10/2022 | Miki | |
| 2023/0138145 A1 | 5/2023 | Mizutani | |

* cited by examiner

ACTIVATION PHASE

NORMAL PHASE

SLEEP PHASE

SPECIALIST PROCESSING PHASE

INFORMATION PROCESSING DEVICE, VEHICLE, INFORMATION PROCESSING METHOD, AND COMPUTER-READABLE STORAGE MEDIUM

CROSS-REFERENCE TO RELATED APPLICATION

This application is based on and claims priority under 35 USC § 119 from Japanese Patent Application No. 2022-002612 filed on Jan. 11, 2022, the disclosure of which is incorporated by reference herein.

TECHNICAL FIELD

The present disclosure relates to an information processing device that can be applied to a vehicle system, a vehicle, an information processing method, and a computer-readable storage medium stored with an information processing program.

RELATED ART

Japanese Patent Application Laid-Open (JP-A) No. 2016-091109 (Patent Document 1) proposes a dynamic resource allocation device that computes a resource allocation amount to a virtual machine in order to dynamically allocate a resource. Specifically, this resource allocation device includes a usage amount computation section that computes a confirmed usage amount, this being an actual resource usage amount, for each timeslot formed by dividing a resource fluctuation cycle according to the virtual machine, and a spike detection section that detects any spikes in the confirmed usage amount. Also included is an allocation amount computation section that computes a resource allocation amount to be allocated to an $i^{th}$ timeslot based on a past confirmed usage amount during the $i^{th}$ timeslot and on a past spike detection result for time slots included in a predetermined range before and after the $i^{th}$ timeslot, and an allocation amount setting section that sets an allocation amount on a virtual machine monitor that controls the virtual machine.

In systems such an onboard system in which real time performance must be guaranteed, if the resource allocation time period is dynamically adjusted it becomes difficult to verify the workability of the system, and so there is room for improvement regarding this point.

SUMMARY

In consideration of the above circumstances, an object of the present disclosure is to provide an information processing device, a vehicle, an information processing method, and a computer-readable storage medium stored with an information processing program that can be applied to a system requiring real time performance, and in which resource allocation time periods are adjustable.

An information processing device according to a first aspect includes a generation section, a detection section, and a setting section. The generation section is configured to generate plural virtual machines including a management virtual machine configured to manage the plural virtual machines. The detection section is configured to detect plural predetermined phases. The setting section is configured to set an allocation time period of a resource for each of the plural virtual machines based on a detection result of the detection section so as to conform to a schedule predetermined for each of the phases. In cases in which there is no phase switchover request within a predetermined duration since a switchover was performed to one of the predetermined phases, the setting section sets the allocation time periods so as to conform to a predetermined reference phase schedule in which the allocation time periods are distributed across the plural virtual machines.

In the first aspect, the generation section generates the plural virtual machines including the management virtual machine that manages the plural virtual machines.

The detection section detects the plural predetermined phases. The setting section sets the resource allocation time period for each of the plural virtual machines based on the detection result of the detection section so as to conform to the schedule predetermined for each of the phases. This enables the resource allocation time periods to be changed for each of the phases. Moreover, the resource allocation time periods are fixed and the scheduling is static in each phase, thereby enabling the real time performance required for an onboard system to be guaranteed. This enables an information processing device to be provided that can be applied to a system requiring real time performance, and in which the resource allocation time periods are adjustable.

Furthermore, in cases in which there is no phase switchover request within the predetermined duration since a switchover was performed to one of the predetermined phases, the setting section sets the allocation time periods so as to conform to the predetermined reference phase schedule in which the allocation time periods are distributed across the plural virtual machines. Thus, even in cases in which the management virtual machine malfunctions for some reason and a phase switchover cannot be performed, the allocation time periods are set so as to conform to the reference phase schedule, thereby enabling the occurrence of issues such as the system failing to start up to be suppressed.

A second aspect may be configured such that the plural phases include a normal phase serving as the reference phase and in which the allocation time periods for the plural virtual machines are each set to a predetermined normal time period. This enables the allocation time periods required to perform normal operation to be allocated to the respective virtual machines, and allows any abnormalities to be dealt with.

A third aspect may be configured such that the plural phases include an activation phase in which the allocation time period is set for the management virtual machine alone or in which the allocation time period for the management virtual machine is set to a longer time period than for the other virtual machines, and the predetermined duration includes an activation phase duration decided in accordance with the activation phase. This enables the management virtual machine that has functionality such as performing initialization required to operate the respective virtual machines to be quickly activated.

A fourth aspect may be configured such that the plural phases include a sleep phase in which the allocation time period for the management virtual machine is set to a longer time period than for the other virtual machines, and the predetermined duration includes a sleep phase duration decided in accordance with the sleep phase. This enables recovery time from sleep to be shortened.

A fifth aspect may be configured such that the plural phases include a specialist processing phase in which the allocation time period is only set for a specialist virtual machine that performs predetermined specialist processing or in which the allocation time period for the specialist virtual machine is set to a longer time period than for the other virtual machines, and the predetermined duration includes a specialist processing phase duration decided in accordance with the specialist processing phase. This enables the resource to be chiefly directed toward the specialist virtual machine that performs the specialist processing.

A sixth aspect may be configured as a vehicle including the information processing device according to any one of the first to the fifth aspects.

A seventh aspect may be configured as an information processing method wherein a computer is configured to perform processing including: generating plural virtual machines including a management virtual machine configured to manage the plural virtual machines; detecting plural predetermined phases; and setting an allocation time period of a resource for each of the plural virtual machines based on a detection result for the phases so as to conform to a schedule predetermined for each of the phases, and in cases in which there is no phase switchover request within a predetermined duration since a switchover was performed to one of the predetermined phases, setting the allocation time periods so as to conform to a predetermined reference phase schedule in which the allocation time periods are distributed across the plural virtual machines.

An eighth aspect may be configured as an information processing program for causing a computer to execute processing including: generating plural virtual machines including a management virtual machine configured to manage the plural virtual machines; detecting plural predetermined phases; and setting an allocation time period of a resource for each of the plural virtual machines based on a detection result for the phases so as to conform to a schedule predetermined for each of the phases, and in cases in which there is no phase switchover request within a predetermined duration since a switchover was performed to one of the predetermined phases, setting the allocation time periods so as to conform to a predetermined reference phase schedule in which the allocation time periods are distributed across the plural virtual machines.

As described above, the present disclosure enables the information processing device, the vehicle, the information processing method, and the computer-readable storage medium stored with an information processing program to be provided that can be applied to a system requiring real time performance, and in which the resource allocation time periods are adjustable.

DETAILED DESCRIPTION

Figure 1:
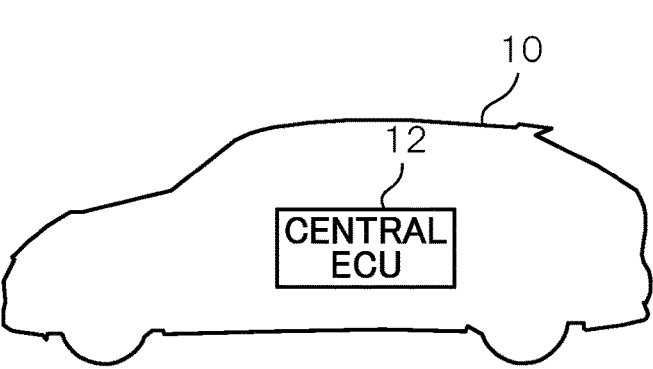
FIG. 1 is a diagram illustrating a vehicle installed with a central ECU according to an exemplary embodiment.
Figure 2:
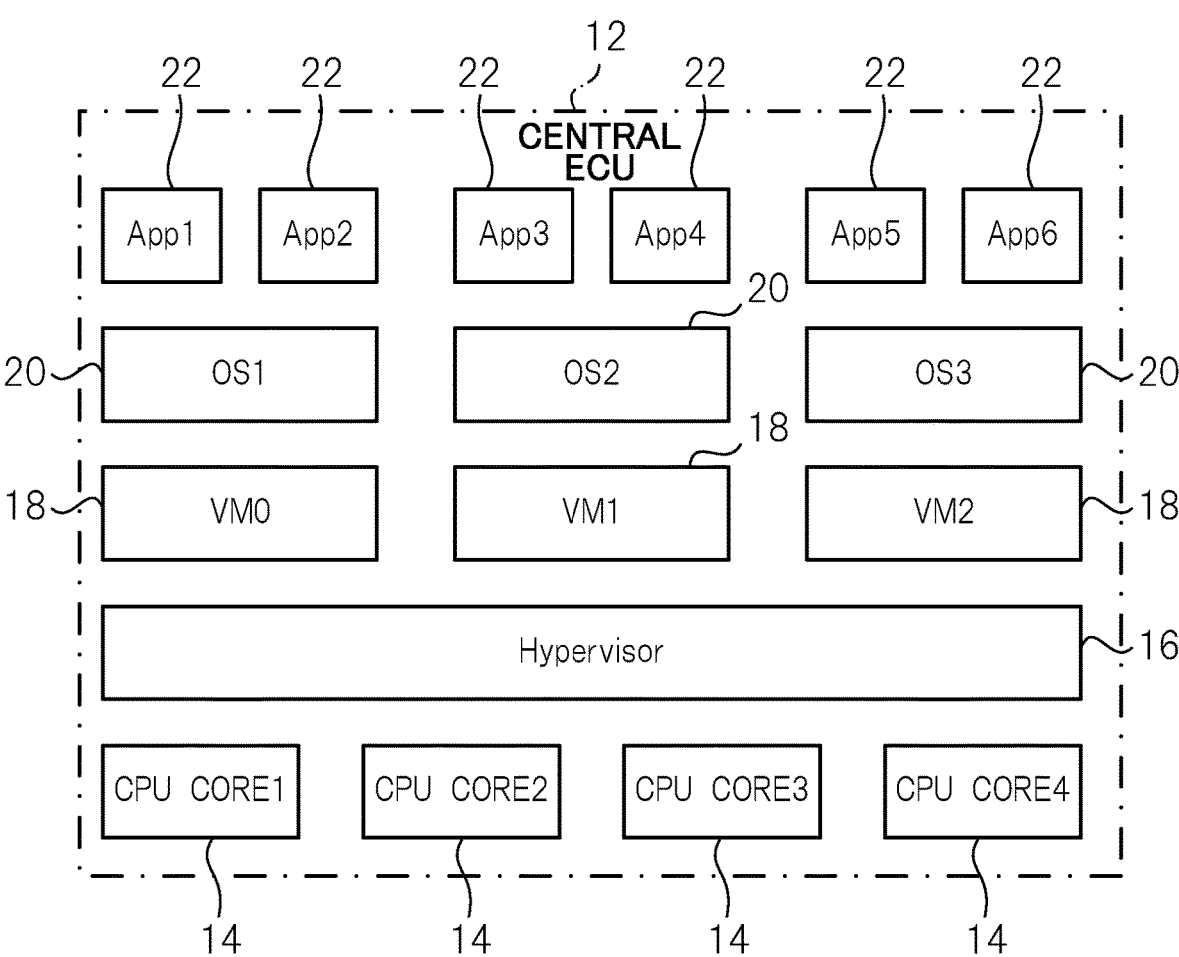
FIG. 2 is a block diagram illustrating a schematic configuration of a central ECU according to an exemplary embodiment.

Detailed explanation follows regarding an example of an exemplary embodiment of the present disclosure, with reference to the drawings. In the present exemplary embodiment, a central ECU installed to a vehicle is described as an example of an information processing device. In the present exemplary embodiment, FIG. 1 is a diagram illustrating a vehicle installed with a central electronic control unit (ECU) according to the present exemplary embodiment, and FIG. 2 is a block diagram illustrating a schematic configuration of the central ECU according to the present exemplary embodiment.

A central ECU 12 according to the present exemplary embodiment is installed to a vehicle 10, and performs consolidated control of various ECUs provided to the vehicle 10.

The central ECU 12 is provided with central processing units (CPUs). In the present exemplary embodiment as an example, plural (four in the example in FIG. 2, these being CPU CORE 1 to CPU CORE 4) CPU COREs 14 are present as illustrated in FIG. 2.

In the present exemplary embodiment, the physical CPU COREs 14 are virtualized by a hypervisor 16, this being computer virtualization software, to generate virtual machines (VMs) 18 serving as virtual machines. In the present exemplary embodiment, plural of the VMs 18 are generated by the hypervisor 16. FIG. 2 illustrates an example in which three VMs 18 VM0 to VM2 are generated as the plural VMs 18.

An operating system (OS) 20 is disposed above the VMs 18, and applications (Apps) 22 operate above the OSs 20. In FIG. 2, an App1 and an App2 operate above an OS1, an App3 and an App4 operate above an OS2, and an App5 and an App6 operate above an OS3.

In a general hypervisor, a function to manage the respective VMs is included within the hypervisor itself. However, in the hypervisor 16 for an onboard system such as that in the present exemplary embodiment, the functionality of the hypervisor 16 is greatly reduced in order to guarantee real time performance, and so the function to manage the respective VMs is assigned to one of the VMs 18. In the present exemplary embodiment, the VM0 functions as a management virtual machine that manages the respective VMs 18. In the following explanation, the VM0 is sometimes referred to as the overall management VM 18. By providing the overall management VM 18, the degree of coupling between the overall management VM 18 and the respective VMs 18 increases, such that there is an interdependent relationship.

Since there are plural of the VMs 18, the hypervisor 16 allocates a CPU time period to each of the VMs 18 so as to demonstrate that the respective VMs 18 are operating in parallel with one another.

In order to make the respective VMs 18 operate efficiently, it would be desirable to dynamically change the scheduling of the CPU allocation time periods, this being a resource. However, it would be difficult to guarantee real time performance if the scheduling were dynamically changed in an onboard system.

To address this, in the central ECU 12 according to the present exemplary embodiment, partially-dynamic scheduling is performed by changing the scheduling of the CPU allocation time periods for each phase. This enables appropriate scheduling for each phase to be applied. Moreover, since the scheduling is static when considered in terms of phase units, real time performance is guaranteed.

Figure 3:
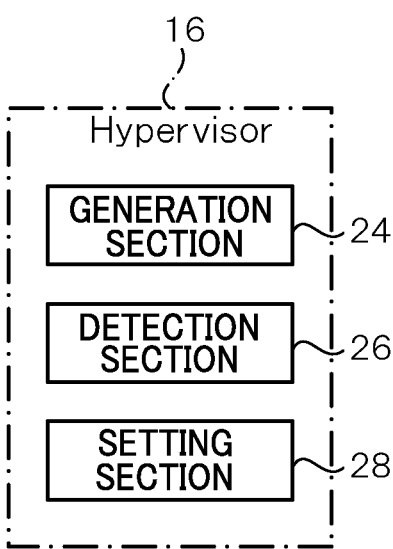
FIG. 3 is a functional block diagram illustrating functionality of a hypervisor.

Explanation follows regarding functional configuration of the hypervisor 16 in order to change the scheduling of the CPU allocation time periods for each phase. FIG. 3 is a functional block diagram illustrating functionality of the hypervisor 16.

As illustrated in FIG. 3, the hypervisor 16 includes the functionality of a generation section 24, a detection section 26, and a setting section 28.

The generation section 24 virtualizes the physical CPU COREs 14 so as to generate and execute the plural VMs 18. In the present exemplary embodiment, the three VMs 18 VM0 to VM2 are generated as described previously.

The detection section 26 detects plural phases in order to change the CPU allocation time periods. In the present exemplary embodiment, four phases, these being an activation phase, a normal phase, a sleep phase, and a specialist processing phase, are detected.

The setting section 28 sets the scheduling of the CPU allocation time periods by changing the CPU allocation time periods based on a detection result of the detection section 26 so as to conform to a schedule predetermined for each of the phases. In the present exemplary embodiment, the scheduling of the CPU allocation time periods for each phase is changed for each phase out of the activation phase, the normal phase, the sleep phase, and the specialist processing phase.

Figure 4:
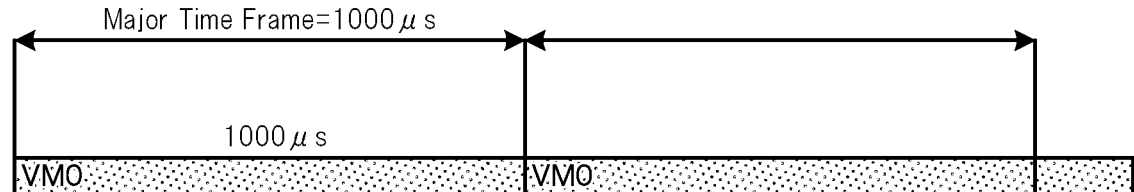
FIG. 4 is a diagram illustrating an example of scheduling of CPU allocation time periods for each phase.
Figure 4:
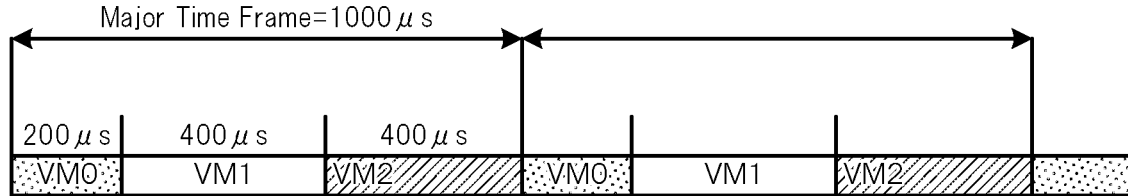
Figure 4:
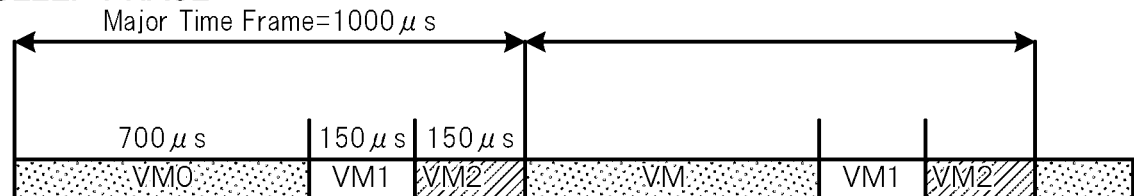
Figure 4:
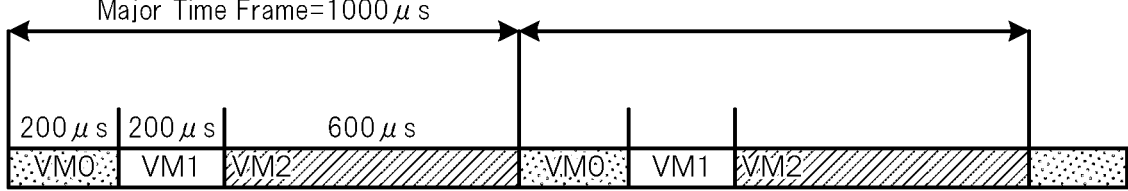

FIG. 4 is a diagram illustrating an example of scheduling of the CPU allocation time periods for each phase. Namely, FIG. 4 illustrates an example of scheduling of the CPU allocation time periods for the activation phase, the normal phase, the sleep phase, and the specialist processing phase. In each of the phases, a major time frame=1000 μs.

In the activation phase, in order to quickly activate the overall management VM 18 (the VM0 in FIG. 2) that has functionality to perform initialization required to operate the respective VMs 18, the VM0 has exclusive use of the CPU time. Namely, in the activation phase in FIG. 4, the VM0 has 1000 μs and the VM1 and the VM2 each have 0 μs. After initialization of the overall management VM 18, there is a transition to the normal phase. Note that although an example in which the VM0 has exclusive use of the CPU time is illustrated in FIG. 4, there is no limitation thereto. The CPU allocation time period for the VM0 may set to a longer time period than for the VM1 and the VM2.

In the normal phase, the CPU allocation time periods required for normal operation of the respective VMs 18 are each set as a predetermined normal time period. FIG. 4 illustrates an example in which the VM0 is allocated 200 μs and the VM1 and the VM2 are each allocated 400 μs.

In the sleep phase, data storage demands are chiefly directed toward the VM0, this being the overall management VM 18 that collectively manages non-volatile memory. Thus, the CPU allocation time period for the overall management VM 18 is increased, and its sleep time is reduced. FIG. 4 illustrates an example in which the VM0 is allocated 700 μs and the VM1 and the VM2 are each allocated 150 μs.

In the specialist processing phase, for example, in cases in which the VM2 serves as a specialist virtual machine that performs specialist processing, the CPU allocation time period for the VM2 that performs the specialist processing is increased such that this specialist processing can be executed as a priority. FIG. 4 illustrates an example in which the VM0 and the VM1 are each allocated 200 μs and the VM2 is allocated 600 μs. Note that explanation follows regarding an example in which processing such as collision detection is performed in the specialist processing phase. Moreover, in the specialist processing phase, CPU time may be allocated to the VM2 alone such that the VM2 has exclusive use of the CPU time in order to perform the specialist processing such as collision detection.

By changing the scheduling of the CPU allocation time periods for the respective VMs 18 in each phase so as to adjust the resource allocation time periods in this manner, the CPU allocation time periods are fixed and the scheduling is static in each phase, thereby enabling the real time performance required for the onboard system to be guaranteed.

However, in cases in which the overall management VM 18 and so on malfunction for some reason, such that there is no initialization complete notification in the activation phase and a phase switchover cannot be performed, the whole system cannot be started up. Moreover, in cases in which there is no phase switchover request while in any of the other phases, the phase cannot be returned to the normal phase.

To address this, in the present exemplary embodiment, in cases in which there is no phase switchover request within a predetermined duration since a phase switchover was performed, the setting section 28 sets the allocation time periods so as to conform to the normal phase serving as a predetermined reference phase schedule, and forcibly transitions to the normal phase. Note that although an example is described in which the normal phase schedule is applied as the reference phase schedule in the following explanation, there is no limitation thereto. For example, a reference phase that is separate to the normal phase may be additionally provided, and preset CPU allocation time periods serving as the reference phase may be applied as the reference phase schedule. Alternatively, the CPU allocation time periods for another phase may be applied as the reference phase schedule.

Figure 5:
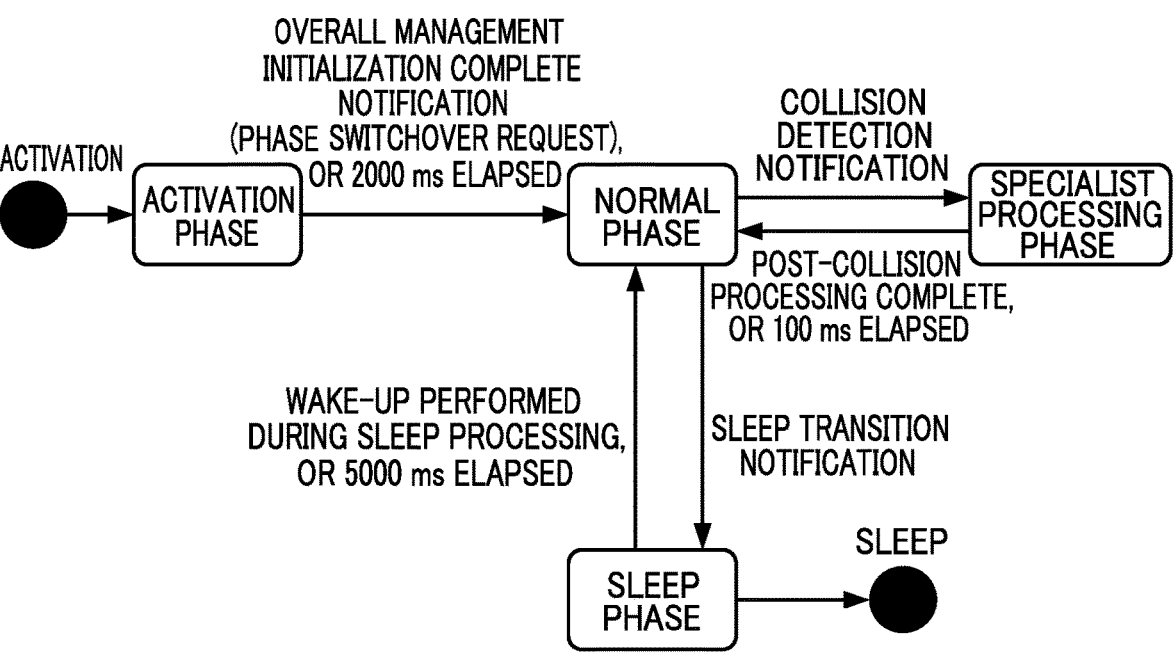
FIG. 5 is a diagram for explaining transition between phases.

Specifically, as illustrated in FIG. 5, in cases in which there has been no phase switchover request despite a predetermined duration for the phase having elapsed since transitioning to a particular phase, the setting section sets the allocation time periods so as to conform to the normal phase, and switches to the normal phase.

In the example in FIG. 5, a switchover to the normal phase is performed in cases in which there has been no initialization complete notification despite a first duration (2000 ms in the example in FIG. 5), serving as an activation phase duration that is a predetermined duration, having elapsed since transitioning to the activation phase during activation.

A switchover to the normal phase is also performed in cases in which wake-up has not been performed during sleep processing despite a second duration (5000 ms in the example in FIG. 5), serving as a sleep phase duration that is a predetermined duration, having elapsed since transitioning from the normal phase to the sleep phase as a result of a sleep transition notification. Note that when transitioning from the sleep phase to the normal phase, the switchover to the normal phase is performed via the activation phase.

A switchover to the normal phase is also performed in cases in which there has been no post-collision processing complete notification despite a third duration (100 ms in the example in FIG. 5), serving as a specialist processing phase duration that is a predetermined duration, having elapsed since transitioning from the normal phase to the specialist processing phase as a result of a collision detection notification.

Note that the predetermined durations before recovering from the respective phases to the normal phase illustrated in FIG. 5 are merely an example, and there is no limitation to the above durations.

Figure 6:
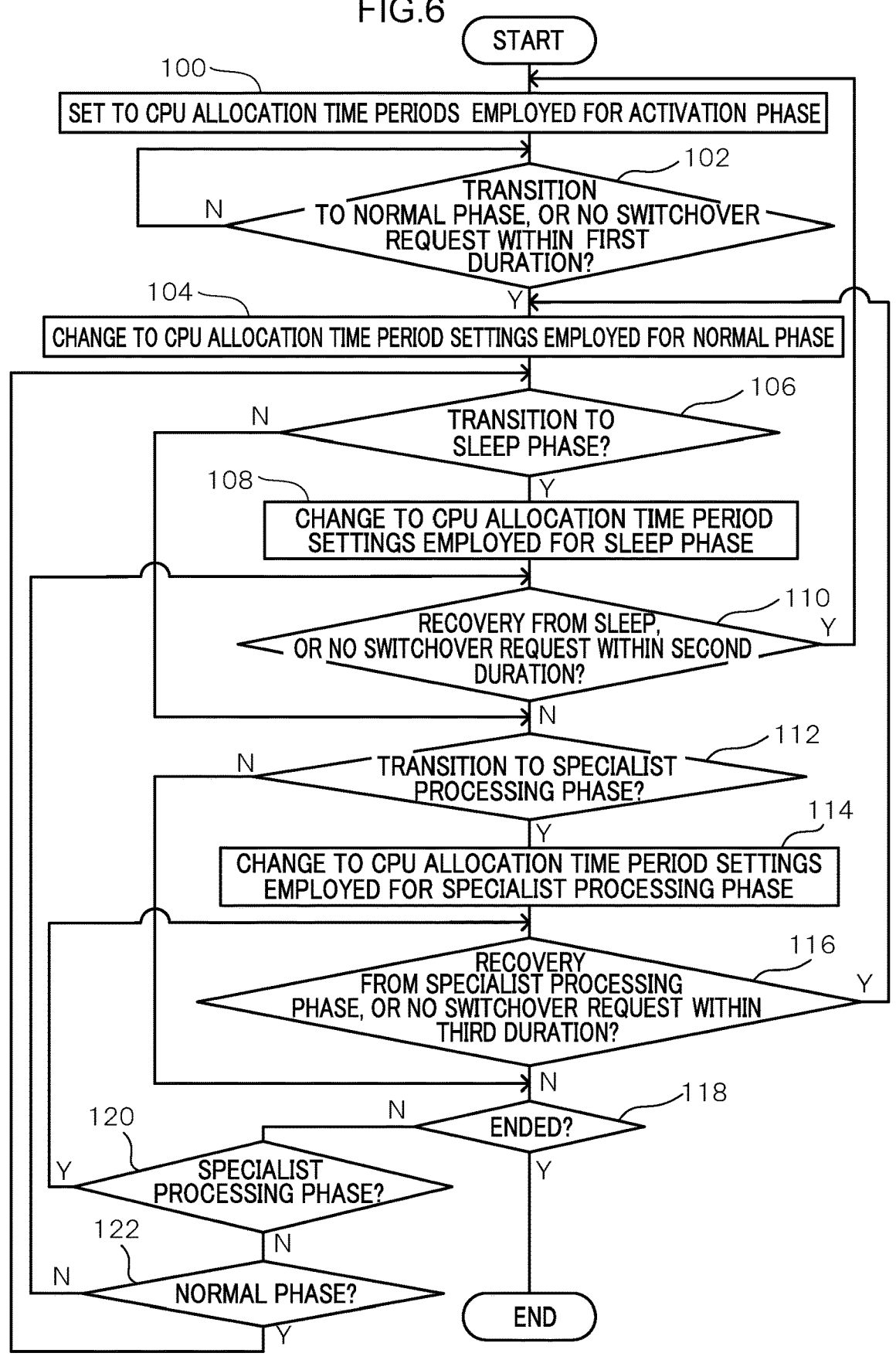
FIG. 6 is a flowchart illustrating an example of a flow of processing when setting of CPU allocation time periods is performed by a central ECU according to an exemplary embodiment.

Next, explanation follows regarding specific processing performed by the central ECU 12 according to the present exemplary embodiment configured as described above. FIG. 6 is a flowchart illustrating an example of a flow of processing when the setting of the CPU allocation time periods is performed by the central ECU 12 according to the present exemplary embodiment. Note that the processing in FIG. 6 starts for example in cases in which a non-illustrated vehicle power source such as an ignition switch is switched on.

At step 100, the hypervisor 16 sets the CPU allocation time periods employed for the activation phase, and transitions to step 102. Namely, when the vehicle power source is switched on, the detection section 26 detects the activation phase, and the setting section 28 sets the CPU allocation time periods employed for the activation phase. Specifically, as illustrated in FIG. 4, the VM0 that is the overall management VM 18 has 1000 μs and the VM1 and the VM2 each have 0 μs, such that the VM0 that is the overall management VM 18 is set to have exclusive use of the CPU time.

At step 102, the hypervisor 16 determines whether or not there has been a transition to the normal phase, or whether or not there has been no phase switchover request within the first duration serving as the activation phase duration since phase switchover was performed. This determination for example involves determining whether or not the detection section 26 has received an activation phase end notification from the overall management VM 18, or whether or not there has been no phase switchover request within 2000 ms since switching to the activation phase. Standby is performed until this determination is affirmative, after which processing transitions to step 104. Note that in cases in which there has been no phase switchover request within the first duration serving as the activation phase duration and the determination is affirmative at step 102, the setting section 28 forcibly switches the phase to the normal phase on transitioning to step 104.

At step 104, the hypervisor 16 changes to the CPU allocation time periods employed for the normal phase, and transitions to step 106. Namely, the setting section 28 changes to the CPU allocation time period settings employed for the normal phase. Specifically, the CPU allocation time periods are changed such that the VM0 has 200 μs and the VM1 and the VM2 each have 400 μs as illustrated in FIG. 4.

At step 106, the hypervisor 16 determines whether or not a transition has been made to the sleep phase. This determination for example involves determining whether or not the detection section 26 has detected that a predetermined condition for transitioning to the sleep phase has been satisfied. Processing transitions to step 108 in cases in which this determination is affirmative, whereas processing transitions to step 112 in cases in which this determination is negative.

At step 108, the hypervisor 16 changes to the CPU allocation time period settings employed for the sleep phase, and transitions to step 110. Namely, the setting section 28 changes to the CPU allocation time period settings employed for the sleep phase. Specifically, the CPU allocation time period for the overall management VM 18 is increased and the sleep transition and recovery time are shortened, such that the VM0 that is the overall management VM 18 has 700 μs and the VM1 and the VM2 each have 150 μs as illustrated in FIG. 4.

At step 110, the hypervisor 16 determines whether or not there has been a recovery from sleep, or whether or not there has been no phase switchover request within the second duration serving as the sleep phase duration since phase switchover was performed. This determination for example involves determining whether or not the detection section 26 has detected that a predetermined condition for recovering from sleep has been satisfied, or whether or not there has been no phase switchover request within 5000 ms since switching to the sleep phase. Processing returns to step 100 and the above described processing is repeated in cases in which this determination is affirmative, whereas processing transitions to step 112 in cases in which this determination is negative. Note that although an example is described in which the activation phase is set after recovering from the sleep phase and returning to step 100 in the present exemplary embodiment, there is no limitation thereto. There may be a transition to the normal phase after recovering from the sleep phase. In such cases, processing transitions to step 104 in cases in which the determination is affirmative at step 110. Moreover, in cases in which there has been no phase switchover request within the second duration serving as the sleep phase duration and determination is affirmative at step 110, the setting section 28 forcibly switches the phase to the normal phase via the activation phase on transitioning to step 100.

At step 112, the hypervisor 16 determines whether or not there has been a transition to the specialist processing phase. This determination for example involves determining whether or not the detection section 26 has detected that a predetermined condition for transitioning to the specialist processing phase has been satisfied. Processing transitions to step 114 in cases in which this determination is affirmative, whereas processing transitions to step 118 in cases in which this determination is negative.

At step 114, the hypervisor 16 changes to the CPU allocation time periods employed for the specialist processing phase, and transitions to step 116. Namely, the setting section 28 changes to the CPU allocation time period settings employed for the specialist processing phase. Specifically, the CPU allocation time periods are changed such that the VM0 and the VM1 each have 200 μs and the VM2 has 600 μs as illustrated in FIG. 4.

At step 116, the hypervisor 16 determines whether or not there has been a recovery from the specialist processing phase, or whether or not there has been no phase switchover request within the third duration serving as the specialist processing phase duration since phase switchover was performed. This determination for example involves determining whether or not the detection section 26 has detected that a predetermined condition for recovering from the specialist processing phase has been satisfied, or whether or not there has been no phase switchover request within 100 ms since switching to the specialist processing phase. Processing returns to step 104 and the above described processing is repeated in cases in which this determination is affirmative, whereas processing transitions to step 118 in cases in which this determination is negative. Note that in cases in which there has been no phase switchover request within the third duration serving as the specialist processing phase duration and determination is affirmative, the setting section 28 forcibly switches the phase to the normal phase on transitioning to step 104.

At step 118, the hypervisor 16 determines whether or not the processing has ended. This determination for example involves determining whether or not the detection section 26 has detected that the non-illustrated vehicle power source such as the ignition switch has been switched off. Processing transitions to step 120 in cases in which this determination is negative, whereas the series of processing is ended in cases in which this determination is affirmative.

At step 120, the hypervisor 16 determines whether or not the specialist processing phase is occurring. This determination involves determining whether the specialist processing phase is in progress. In cases in which the specialist processing phase is in progress, determination is affirmative, processing returns to step 116, and the above-described processing is repeated. On the other hand, in cases in which the sleep phase or the normal phase is in progress, determination is negative and processing transitions to step 122.

At step 122, the hypervisor 16 determines whether or not the normal phase is occurring. This determination involves determining whether the normal phase is in progress. In cases in which the normal phase is in progress, determination is affirmative, processing returns to step 106, and the above-described processing is repeated. On the other hand, in cases in which the sleep phase is in progress, determination is negative, processing returns to step 110, and the above-described processing is repeated.

Performing the processing in the above manner enables the scheduling of the CPU allocation time periods for the respective VMs 18 in each phase to be changed, and enables the resource allocation time periods to be adjusted.

Moreover, the CPU allocation time periods are fixed and the scheduling is static in each phase, thereby enabling the real time performance required for the onboard system to be guaranteed.

Furthermore, even in cases in which the overall management VM 18 malfunctions for some reason and a phase switchover cannot be performed, there is a forcible switchover to the normal phase and the CPU allocation time periods employed for the normal phase are set, thereby enabling the occurrence of issues such as the system failing to start up to be suppressed.

Note that although an example has been described in which there are four CPU COREs 14 in the above exemplary embodiment, there is no limitation thereto. For example, a format may be applied including a single CPU CORE 14, or a format may be applied including a plural number of CPU COREs other than four.

Moreover, although an example has been described in which the hypervisor 16 generates three VMs 18 in the above exemplary embodiment, there is no limitation thereto. For example, two VMs 18 may be generated, or four or more VMs 18 may be generated.

Moreover, although an example has been described in which there are four phases, these being the activation phase, the normal phase, the sleep phase, and the specialist processing phase, serving as phases in the above exemplary embodiment, the number of phases is not limited to four phases. For example, there may be plural different phases other than these four phases, there may be two or three phases from out of these four phases, or there may be plural phases including other additional phases to these four phases.

Moreover, the processing performed by the hypervisor 16 in the above exemplary embodiment may be stored and distributed in various storage media serving as programs.

Furthermore, the present disclosure is not limited to the above description, and obviously various other modifications may be implemented within a range not departing from the spirit of the present disclosure.

What is claimed is:

1. An information processing device comprising at least one processor, the at least one processor being configured to:

generate a plurality of virtual machines including a management virtual machine configured to manage other virtual machine among the plurality of virtual machines;

detect a phase of the information processing device among a plurality of predetermined phases;

set an allocation time period of a resource for each of the plurality of virtual machines based on the detected phase so as to conform to a schedule predetermined for each of the plurality of predetermined phases, and when there is no phase switchover request within a predetermined duration since a switchover was performed to one of the plurality of predetermined phases, set the allocation time periods so as to conform to a predetermined reference phase schedule in which the allocation time periods are distributed across the plurality of virtual machines; and operate the plurality of virtual machines according to the set allocation time periods.

2. The information processing device of claim 1, wherein:

the plurality of phases includes a normal phase serving as the reference phase and in which the allocation time periods for the plurality of virtual machines are each set to a predetermined normal phase time period.

3. The information processing device of claim 1, wherein:

the plurality of phases includes an activation phase in which the allocation time period is set for the management virtual machine alone or in which the allocation time period for the management virtual machine is set to a longer time period than for the other virtual machines; and the predetermined duration includes an activation phase duration decided in accordance with the activation phase.

4. The information processing device of claim 2, wherein:

the plurality of phases includes an activation phase in which the allocation time period is set for the management virtual machine alone or in which the allocation time period for the management virtual machine is set to a longer time period than for the other virtual machines; and the predetermined duration includes an activation phase duration decided in accordance with the activation phase.

5. The information processing device of claim 1, wherein:

the plurality of phases includes a sleep phase in which the allocation time period for the management virtual machine is set to a longer time period than for the other virtual machines; and the predetermined duration includes a sleep phase duration decided in accordance with the sleep phase.

6. The information processing device of claim 2, wherein:

the plurality of phases includes a sleep phase in which the allocation time period for the management virtual machine is set to a longer time period than for the other virtual machines; and the predetermined duration includes a sleep phase duration decided in accordance with the sleep phase.

7. The information processing device of claim 3, wherein:

the plurality of phases includes a sleep phase in which the allocation time period for the management virtual machine is set to a longer time period than for the other virtual machines; and the predetermined duration includes a sleep phase duration decided in accordance with the sleep phase.

8. The information processing device of claim 1, wherein:

the plurality of phases includes a specialist processing phase in which the allocation time period is only set for a specialist virtual machine that performs predetermined specialist processing or in which the allocation time period for the specialist virtual machine is set to a longer time period than for the other virtual machines; and the predetermined duration includes a specialist process-
ing phase duration decided in accordance with the
specialist processing phase.

9. The information processing device of claim 2, wherein:

the plurality of phases includes a specialist processing
phase in which the allocation time period is only set for
a specialist virtual machine that performs predeter-
mined specialist processing or in which the allocation
time period for the specialist virtual machine is set to a
longer time period than for the other virtual machines;
and the predetermined duration includes a specialist process-
ing phase duration decided in accordance with the
specialist processing phase.

10. The information processing device of claim 1,
wherein:

the plurality of phases includes a specialist processing
phase in which the allocation time period is only set for
a specialist virtual machine that performs predeter-
mined specialist processing or in which the allocation
time period for the specialist virtual machine is set to a
longer time period than for the other virtual machines;
and the predetermined duration includes a specialist process-
ing phase duration decided in accordance with the
specialist processing phase.

11. A vehicle comprising the information processing
device of claim 1.

12. A vehicle comprising the information processing
device of claim 2.

13. A vehicle comprising the information processing
device of claim 3.

14. An information processing method wherein a com-
puter is configured to perform processing comprising:

generating a plurality of virtual machines including a
management virtual machine configured to manage
other virtual machines among the plurality of virtual
machines;

detecting a phase of the information processing device
among a plurality of predetermined phases;

setting an allocation time period of a resource for each of
the plurality of virtual machines based on the detected
phase so as to conform to a schedule predetermined for
each of the plurality of predetermined phases, and
when there is no phase switchover request within a
predetermined duration since a switchover was per-
formed to one of the plurality of predetermined phases,
setting the allocation time periods so as to conform to
a predetermined reference phase schedule in which the
allocation time periods are distributed across the plu-
rality of virtual machines; and operating the plurality of virtual machines according to
the set allocation time periods.

15. A non-transitory computer-readable storage medium
stored with an information processing program for causing
a computer to execute processing comprising:

generating a plurality of virtual machines including a
management virtual machine configured to manage
other virtual machines among the plurality of virtual
machines;

detecting a phase of the information processing device
among the plurality of predetermined phases;

setting an allocation time period of a resource for each of
the plurality of virtual machines based on the detected
phase so as to conform to a schedule predetermined for
each of the plurality of predetermined phases, and
when there is no phase switchover request within a
predetermined duration since a switchover was per-
formed to one of the plurality of predetermined phases,
setting the allocation time periods so as to conform to
a predetermined reference phase schedule in which the
allocation time periods are distributed across the plu-
rality of virtual machines; and operating the plurality of virtual machines according to
the set allocation time periods.

\* \* \* \* \*